United States Patent Office 3,047,580
Patented July 31, 1962

3,047,580
10-(OMEGA-AMINO ALKYL)-10-HYDROXY-THIAXANTHENES
James M. Sprague, Gwynedd Valley, Pa., assignor to Merck & Co., Inc., Rahway, N.J., a corporation of New Jersey
No Drawing. Filed Sept. 29, 1961, Ser. No. 141,600
6 Claims. (Cl. 260—293.4)

This invention relates to new thiaxanthene derivatives having the following general structure

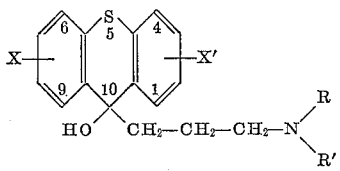

wherein X and X' respectively represents hydrogen, halogen particularly chlorine, bromine or fluorine, a lower alkyl radical for example a straight or branched chain alkyl radical having from 1 to about 4 carbon atoms, a perfluoroalkyl radical having from 1 to about 4 carbon atoms, a lower alkoxy radical preferably having a straight or branched alkyl chain with from 1 to about 4 carbon atoms, and a mononuclear aryl radical such as phenyl radical; and

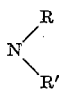

is a tertiary amino group and particularly a tertiary amino group selected from the di-lower-alkyl-amino, 1-piperidyl, 1-pyrrolidyl or 4-morpholinyl or a 1-lower alkyl-4-piperazinyl radical. One or more of the hydrogens attached to the propyl side chain can be substituted by a lower alkyl group provided the total number of carbons in all substituent alkyl groups does not exceed four. When one or more of the propyl hydrogens is substituted by an alkyl group, one of the alkyl substituents can be linked with R' to form a heterocyclic ring with the nitrogen atom.

The compounds of this invention have been found to be valuable intermediates for the preparation of thiaxanthenes having the general structure

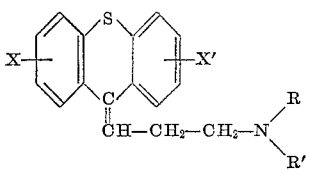

wherein X, X', R and R' have the meaning assigned to each of them above, which are therapeutic agents particularly because of their anti-emetic properties and/or antihistaminic and/or anti-serotonin properties. For physiological purposes, the 10-propylidene derivatives are conveniently administered as salts, the identity of the acid being of little importance provided it is non-toxic. The salts are, therefore, considered to be equivalent to the bases.

The compounds of this invention are also useful as intermediates as the 10-hydroxy group can be reduced to hydrogen as by heating with HI, as described in Patent 2,951,082, to form 10-dialkylaminopropyl thiaxanthenes which also possess anti-emetic properties.

The novel compounds of this invention are advantageously synthesized by preparing the Grignard reagent from the appropriate 3-tertiary aminopropyl halide in tetrahydrofuran. The desired thiaxanthone derivative then is added to the reaction mixture. After hydrolysis of the Grignard adduct, the 10-(3-tertiaryaminopropyl)-10-hydroxythiaxanthene is isolated and dehydrated to the desired 10 - (3 - tertiaryaminopropylidene) - thiaxanthene which can be isolated as an acid addition salt.

Previous workers have employed ether and mixtures of ether and benzene as solvents in the preparation of basically substituted Grignard reagents. In the case of 3-dimethylaminopropyl chloride, the Grignard reagent is insoluble in ether and the separation of the solid stops the reaction. While it has been discovered that the desired end product can be obtained by carefully controlled portionwise addition of the ketone, it is much more convenient and considerably less time consuming to carry out the process by operating in tetrahydrofuran which permits the formation of the organomagnesium compound to go to completion prior to the addition of the ketone.

The dehydration of the 10-hydroxythiaxanthenes of this invention can be effected by known procedures employing known dehydrating agents. Dehydrating agents which have been found especially useful are acetyl chloride, thionyl chloride, and acetic anhydride. Other dehydrating agents as potassium bisulfate, concentrated hydrochloric acid and the like, can also be used. Solvents which are well adapted to the requirements of this step when acetyl chloride or a similar dehydrating agent is employed are chloroform and methylene chloride.

These reactions can be schematically illustrated as follows:

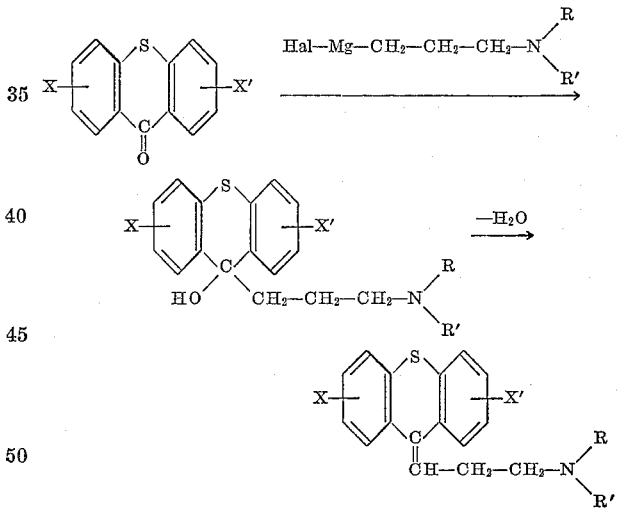

The new compounds and methods for making them will be described in more detail in the following illustrative examples. Methods, other than those mentioned above, that can be employed in making the novel compounds also will be described in the examples. The alkylidine products prepared by dehydration of the 10-hydroxythiaxanthene compounds of this invention which are unsymmetrically substituted in the thiaxanthene nucleus may be obtained as a mixture of geometric isomers. The melting point of the hydrochloride salts of the 10-alkylidene compounds vary depending upon the starting temperature of the melting point bath and with the rate of heating.

This application is a continuation-in-part of United States patent application, Serial No. 679,069, filed August 19, 1957, by James M. Sprague, and now abandoned, which is a continuation-in-part of United States Patent No. 2,996,503, issued August 15, 1961, by James M. Sprague, Edward L. Engelhardt and Marcia E. Christy.

EXAMPLE 1

*10-(3-Dimethylaminopropyl)-10-Hydroxythiaxanthene*

A Grignard reagent is prepared from 14 g. (0.115 mole) of 3-dimethylaminopropyl chloride and 2.8 g. (0.115 g. atom) of magnesium in 50 ml. of dry anisole and 30 ml. of absolute ether in a nitrogen atmosphere, using 1.25 g. (0.0115 mole) of ethyl bromide as an initiator and stirring at 50° C. for 3½ hours.

Anisole, 50 ml., is added and the mixture cooled to 25° C. Thiaxanthone, 21.2 g. (0.1 mole), is added in portions over a 15 minute period. The reaction mixture is stirred for 30 minutes at room temperature and for 90 minutes on the steam bath. After hydrolysis with 50 ml. of water, the mixture is filtered hot through diatomaceous earth and the filter cake washed with benzene. The organic layer is separated from the filtrate and the aqueous layer again extracted with benzene. The combined organic extracts are washed with water, dried, and the benzene distilled under reduced pressure. The residual solution is diluted with petroleum ether and after chilling, 10 - (3 - dimethylaminopropyl) - 10 - hydroxythiaxanthene, 13.1 g., M.P. 133–136° C., is collected. Several recrystallizations from 20% benzene in hexane affords the product with a constant M.P. of 146.5–148.5° C.

*Analysis.*—Calculated for $C_{18}H_{21}ONS$: C, 72.20; H, 7.07; N, 4.68. Found: C, 72.38; H, 7.22; N, 4.65.

EXAMPLE 2

*2-Chloro-10-(3-Dimethylaminopropyl)-10-Hydroxythiaxanthene*

*Step A.*—Magnesium turnings, 4.86 g. (0.2 g. atom), are placed in a 500 ml. reaction flask fitted with a mercury sealed stirrer, reflux condenser and a dropping funnel. The apparatus is flushed with dry nitrogen and protected from atmospheric moisture by means of a drying tube. Tetrahydrofuran, 50 ml., and calcium hydride, 500 mg., are added. Ethyl bromide, 2.18 g., and a crystal of iodine then are added. A vigorous reaction sets in that evolves sufficient heat to induce refluxing. After 5 minutes, a solution of 3-dimethylaminopropyl chloride (dried over calcium hydride) in 50 ml. of tetrahydrofuran is added to the refluxing solution at such a rate that gentle refluxing is maintained. The addition requires 25 minutes. The reaction mixture is stirred at reflux for an additional 30 minutes when nearly all of the magnesium dissolves and determination of magnesium in an aliquot of the solution shows that an 82% yield of 3-dimethylaminopropyl magnesium chloride has been obtained. The reaction mixture is cooled in an ice bath and stirred while 24.67 g. (0.1 mole) of 2-chlorothiaxanthone is added over a period of 10 minutes. The reaction is stirred at room temperature for 30 minutes then allowed to stand over night in the refrigerator. The tetrahydrofuran is evaporated at 50° C. under reduced pressure and benzene, 150 ml., added to the residue. The mixture is hydrolyzed in the cold by the dropwise addition of 50 ml. of water. The benzene layer is separated by decantation and the gelatinous precipitate washed with two 100 ml. portions of benzene. The precipitate then is mixed with diatomaceous earth, collected on a filter, washed with water, and extracted with two 100 ml. portions of boiling benzene. The aqueous filtrate is extracted with 50 ml. of benzene, the combined benzene extracts washed with water and evaporated to dryness under reduced pressure. The crystalline residue, M.P. 140–147° C., weighs 30.8 g. Recrystallization from a mixture of benzene and hexane gives 27.6 g. (83%) of 2 - chloro - 10 - (3 - dimethylaminopropyl) - 10 - hydroxythiaxanthene, M.P. 152–154° C. Analytically pure material from another experiment melted at 153–154° C.

*Analysis.*—Calculated for $C_{18}H_{20}ONCIS$: C, 64.75; H, 6.04; N, 4.20. Found: C, 64.80; H, 5.95; N, 4.20.

*Step B.*—3.34 g. (0.01 mole) of the thus obtained 2-chloro - 10 - (3 - dimethylaminopropyl) - 10 - hydroxythiaxanthene is dissolved in 15 ml. of dry, alcohol-free chloroform. Acetyl chloride, 2.36 g. (0.03 mole) is added and the clear yellow solution refluxed for one hour in a system protected by a drying tube. The solvent then is evaporated on the steam-bath under reduced pressure and the residue dissolved in absolute alcohol. The hydrochloride of 2-chloro-10-(3-dimethylaminopropylidene)-thiaxanthene is precipitated by the cautious addition of absolute ether. After drying at 70° C. the yield of white crystalline 2-chloro-10-(3-dimethylaminopropylidene)-thiaxanthene hydrochloride, M.P. 189–190° C. (to a cloudy melt), is 3.20 g. (90%). This material is a mixture of geometric isomers.

*Analysis.*—Calculated for $C_{18}H_{18}NCIS \cdot HCl$: C, 61.36; H, 5.43; N, 3.97. Found: C, 61.51; H, 5.58; N, 3.89.

EXAMPLE 3

*α-Isomer of 2 Chloro-10-(3-Dimethylaminopropylidene)-Thiaxanthene Hydrochloride*

The hydrochloride, obtained as described in Example 2 (Step B), 35.23 g. (0.1 mole), is dissolved in 200 ml. of water. The solution is made basic with 50 ml. of 10 N sodium hydroxide and the mixture extracted with three 100 ml. portions of benzene. The combined benzene extracts are washed with 50 ml. of water in two portions and the solvent evaporated on the steam-bath under reduced pressure. The viscous yellow oily base weighs 31.14 g. (99%). The base is stored in the dark at room temperature for 11 days. During this time the α-isomer separates in the form of pale yellow crystals. The semisolid mixture is triturated with 50 ml. of petroleum ether (30–60° C.) and the insoluble solid collected and recrystallized repeatedly from nexane-petroleum ether mixtures and alcohol-water mixtures until a constant M.P. of 98–99° C. is attained. The α-isomer of 2-chloro-10-(3-dimethylaminopropylidene)-thiaxanthene then is converted to the hydrochloride that melts at 218.5–219.5° C. (dec.).

*Analysis.*—Calculated for $C_{18}H_{18}NCIS \cdot HCl$: N, 3.97. Found: N, 3.99.

EXAMPLE 4

*β-Isomer of 2-Chloro-10-(3-Dimethylaminopropylidene)-Thiaxanthene Hydrochloride*

The petroleum ether filtrate obtained in Example 3 is cooled to −15° C. and the oily crystals that separated removed. Evaporation of the solvent from the filtrate leaves 14.96 g. of a deep yellow oily residue. This base, 2-chloro-10-(3- dimethylaminopropylidene)-thiaxanthene, is converted to the hydrogen oxalate that melts at 188.5–189.5° C. after repeated recrystallization from alcohol-water mixtures. The base then is liberated from the oxalate and converted to the hydrochloride that melts at 208.5–209.5° C. after crystallization from a mixture of absolute alcohol and absolute ether.

*Analysis.*—Calculated for $C_{18}H_{18}NCIS \cdot HCl$: N, 3.97. Found: N, 3.97.

EXAMPLE 5

*2-Bromo-10-(3-Dimethylaminopropyl)-10-Hydroxythiaxanthene*

By replacing the 2-chlorothiaxanthone used in Example 2 by an equimolecular quantity of 2-bromothiaxanthone, and following substantially the same procedure described in Step A thereof, there is obtained 2-bromo-10-(3-dimethylaminopropyl) - 10 - hydroxythiaxanthene, M.P. 147–148° C.

*Analysis.*—Calculated for $C_{18}H_{20}ONBrS$: C, 57.14; H, 5.33; N, 3.70. Found: C, 57.15; H, 5.45; N, 3.70.

The 10-hydroxythiaxanthene thus obtained then is dehydrated by substantially the same procedure described in Example 2, Step B, to 2-bromo-10-(3-dimethylaminopropylidene)-thiaxanthene hydrochloride, a mixture of geometric isomers which melts at 202–203° C.

*Analysis.*—Calculated for $C_{18}H_{18}NBrS \cdot HCl$: C, 54.48; H, 4.83; N, 3.53. Found: C, 54.75; H, 5.12; N, 3.45.

EXAMPLE 6

*2-Methoxy-7-Chloro-10-[3-(4-Morpholinyl)-Propyl]-10-Hydroxythiaxanthene*

By replacing the 3-dimethylaminopropyl chloride and the 2-chlorothiaxanthone used in Example 2, Step A, by an equimolecular quantity of 3-(4-morpholinyl)-propyl chloride and 2-methoxy-7-chlorothiaxanthone respectively, and following substantially the same procedures described in Step A of Example 2, there is obtained 2-methoxy-7-chloro-10-[3-(4 - morpholinyl)-propyl]-10-hydroxythiaxanthene, which when dehydrated by the process described in Step B, Example 2, is converted to 2-methoxy-7-chloro-10-[3-(4-morpholinyl) - propylidene]-thiaxanthene hydrochloride.

EXAMPLE 7

*3,8-Di-Propoxy-10-(3-Dipropylaminopropyl)-10-Hydroxythiaxanthene*

By replacing the 3-dimethylaminopropyl chloride and the 2-chlorothiaxanthone used in Example 2, Step A, by an equimolecular quantity of 3-dipropylaminopropyl chloride and 3,8-dipropoxythiaxanthone respectively and following substantially the same procedure described in Step A of Example 2, there is obtained 3,8-di-propoxy-10-(3 - dipropylaminopropyl)-10 - hydroxythiaxanthene, which is dehydrated by the process described in Step B of Example 2 to 3,8-di-propoxy-10-(3-dipropylaminopropylidene)-thiaxanthene hydrochloride.

EXAMPLE 8

*2-Chloro-8-Ethyl-10-(2-Methyl-3-Dimethylaminopropyl)-10-Hydroxythiaxanthene*

By replacing the 2-chlorothiaxanthone and the 3-dimethylaminopropyl chloride used in Example 2, Step A, by an equimolecular quantity of 2-chloro-8-ethylthiaxanthone and 2-methyl-3-dimethylaminopropyl chloride respectively, and following substantially the same procedure described in Step A of Example 2, there is obtained 2-chloro-8-ethyl-10-(2-methyl - 3-dimethylaminopropyl)-10-hydroxythiaxanthene, which is dehydrated by the process described in Step B of Example 2 to 2-chloro-8-ethyl-10-(2-methyl-3-dimethylaminopropylidene) - thiaxanthene hydrochloride.

EXAMPLE 9

*2-Chloro-10-[3-(1-Piperidyl)-Propyl]-10-Hydroxythiaxanthene*

By replacing the 3-dimethylaminopropyl chloride used in Example 2, Step A, by an equimolecular quantity of 3-(1-piperidyl)-propyl chloride, and following substantially the same procedure described in Step A of Example 2, there is obtained 2-chloro-10-[3-(1-piperidyl)-propyl]-10-hydroxythiaxanthene, M.P. 138–139° C.

*Analysis.*—Calculated for $C_{21}H_{24}ONClS$: C, 67.45; H, 6.47; N, 3.75. Found: C, 67.68; H, 6.41; N, 3.78.

The 10-hydroxythiaxanthene thus obtained is dehydrated by substantially the same process described in Example 2, Step B, to a mixture of geometric isomers of 2-chloro-10-[3-(1-piperidyl)-propylidene]-thiaxanthene hydrochloride. M.P. 241–245° C.

EXAMPLE 10

*7-Propyl-10-[3-(1-Pyrrolidyl)-Propyl]-10-Hydroxythiaxanthene*

By replacing the 3-dimethylaminopropyl chloride and the 2-chlorothiaxanthone used in Example 2, Step A, by an equimolecular quantity of 3-(1-pyrrolidyl)-propyl chloride and 7-propylthiaxanthone respectively, there is obtained 7-propyl-10-[3-(1 - pyrrolidyl) - propyl] - 10-hydroxythiaxanthene, which is dehydrated to 7-propyl-10-[3-(1-pyrrolidyl) - propylidene]-thiaxanthene hydrochloride by substantially the same process described in Example 2, Step B.

EXAMPLE 11

*2-Chloro-10-(3-Diethylaminopropyl)-10-Hydroxythiaxanthene*

*Step A.*—The Grignard reagent is prepared from 4.86 g. (0.2 g. atom) of magnesium and 29.9 g. (0.2 mole) of 3-diethylaminopropyl chloride following essentially the procedure described in Step A of Example 2. The reaction mixture then is stirred and cooled in an ice bath while 24.67 g. (0.1 mole) of 2-chloro-thiaxanthone is added over a period of 10 minutes. The mixture then is allowed to warm up to room temperature and stirred at refluxing for 1 hour. The reaction mixture then is distilled until 75 ml. of distillate has been collected and the residue diluted with 150 ml. of benzene. The reaction mixture is hydrolyzed in the cold by the dropwise addition of 70 ml. of 30% ammonium chloride solution. The benzene layer is separated by decantation and the gelatinous solid extracted with two 100 ml. portions of benzene. The solid then is stirred with 50 ml. of 10 N sodium hydroxide, mixed with diatomaceous earth and the mixture filtered. The filtrate is extracted with 50 ml. of benzene and the combined benzene extracts washed with water and evaporated to dryness. The residue is an oily solid weighing 36.6 g., M.P. 108–112° C. (sintering at 105° C.). The product is recrystallized from a mixture of benzene and hexane to give 29.75 g. (82%) of 2-chloro-10-(3-diethylaminopropyl)-10-hydroxythiaxanthene, M.P. 115–117° C. Recrystallization from mixtures of benzene and hexane yields the product with a constant M.P. of 116.2–118.2° C.

*Analysis.*—Calculated for $C_{20}H_{24}ONClS$: C, 66.37; H, 6.68; N, 3.87. Found: C, 66.14; H, 6.97; N, 3.87.

*Step B.*—The product obtained in Step A, 7.24 g. (0.02 mole), is dissolved in 30 ml. of dry, alcohol-free chloroform and 4.72 g. (0.06 mole) of acetyl chloride added. The solution is refluxed for 1 hour and the solvent evaporated on the steam bath under reduced pressure. The 2-chloro-10 - (3 - diethylaminopropylidene)-thiaxanthene hydrochloride is separated into the α- and β-forms by dissolving the residue in a mixture of absolute alcohol and absolute acetone and fractionally precipitating with absolute ether.

The α-form melts at 220.3–222.3° C. after repeated recrystallization from a mixture of absolute ethanol and absolute ether.

*Analysis.*—Calculated for $C_{20}H_{22}NClS \cdot HCl$: C, 63.15; H, 6.09; N, 3.68. Found: C, 62.96; H, 6.13; N, 3.66.

The β-form melts at 153.8–155.3° C. after repeated recrystallization from acetone-ether mixtures. Analysis calculated for $C_{20}H_{22}NClS \cdot HCl$: C, 63.15; H, 6.09; N, 3.68. Found: C, 63.12; H, 6.24; N, 3.65.

EXAMPLE 12

*2 - Methoxy - 10 - (3 - Dimethylaminopropyl) - 10-Hydroxythiaxanthene*

*Step A.*—The Grignard reagent is prepared from 2.61 g. (0.107 mole) of magnesium and 13.05 g. (0.0539 mole) of 3-dimethylaminopropyl chloride in 50 ml. of dry tetrahydrofuran essentially as described in Step A of Example 2. 2-methoxythiaxanthone, 13.00 g. (0.0537 mole), is added to the reaction mixture at 25° C. with stirring. After stirring for 15 minutes at room temperature, the mixture is heated to refluxing for 1 hour. The product is isolated following the procedure described in Step A of Example 2. The yield of 2-methoxy-10-(3-dimethylaminopropyl)-10-hydroxy-thiaxanthene is 14.17 g. (80%) after recrystalliation from a mixture of benzene and hexane. Further recrystallization from mixtures of benzene and hexane yields the product melting at 123–124° C.

*Analysis.*—Calculated for $C_{19}H_{23}O_2NS$: C, 69.26; H, 7.04; N, 4.25; S, 9.73. Found: C, 69.24; H, 6.98; N, 4.33; S, 9.61.

*Step B.*—The product obtained in Step A, 8.87 g. (0.0269 mole), is dissolved in 40 ml. of dry, alcohol-free chloroform and the solution treated with 6.35 g. (0.0809 mole) of acetyl chloride. After refluxing the solution for one hour, the solvent is evaporated on the steam bath under reduced pressure. The residue is dissolved in 50 ml. of water and the solution made basic with 10 ml. of 5 N sodium hydroxide. The mixture is extracted with benzene and the extract evaporated leaving the red oily base, 2-methoxy-10-(3-dimethylaminopropylidene)-thiaxanthene. The base is treated with oxalic acid in absolute alcohol solution and the hydrogen oxalate precipitated by addition of absolute ether. After recrystallization from alcohol-ether mixtures, the 2-methoxy-10-(3 - dimethylaminopropylidene) - thiaxanthene hydrogen oxalate melts at 135–138° C. (sintered at 132° C.).

*Analysis.*—Calculated for $C_{19}H_{21}ONS \cdot C_2H_2O_4$: C, 62.82; H, 5.77; N, 3.49. Found: C, 62.70; H, 5.87; N, 3.51.

EXAMPLE 13

2,8 - Dichloro - 10 - (3 - Dimethylaminopropyl) - 10-Hydroxythiaxanthene

*Step A.*—The Grignard reagent is prepared from 9.35 g. (0.384 g. atom) of magnesium and 46.7 g. (0.384 mole) of 3-dimethylaminopropyl chloride, using 3.3 g. of ethyl bromide and employing 150 ml. of tetrahydrofuran as solvent. The procedure of Example 2, Step A, is followed. To the Grignard solution is added 54 g. (0.192 mole) of 2,8-dichlorothiaxanthone. After stirring at room temperature for 1 hour, the bulk of the tetrahydrofuran is distilled at reduced pressure keeping the temperature below 50° C. The residue is taken up in benzene and hydrolyzed in the cold by the dropwise addition of 75 ml. of water. The benzene layer is separated and the solid extracted with four 100 ml. portions of hot benzene. The combined benzene extracts are concentrated under reduced pressure and the residue crystallized from a mixture of benzene and hexane. The yield of product, 2,8-dichloro-10(3-dimethylaminopropyl)-10-hydroxythiaxanthene, M.P. 191.3–192.3° C., is 46.6 g. The product from a similar experiment melted at 190.8–191.8° C., after repeated crystallization from mixtures of benzene and hexane.

*Analysis.*—Calculated for $C_{18}H_{18}ONCl_2S$: C, 58.70; H, 5.20; N, 3.80. Found: C, 58.77; H, 5.09; N, 3.79.

*Step B.*—The thus obtained 2,8 - dichloro-10-(3-dimethylaminopropyl)-10-hydroxy thiaxanthene, 7.2 g. (0.0195 mole), and 4.72 g. (0.06 mole) of acetyl chloride is dissolved in 30 ml. of alcohol-free chloroform. The solution is refluxed for one hour, then evaporated to dryness on the steam bath under reduced pressure. The residual solid is taken up in hot alcohol, the solution cooled in ice and treated with 20% aqueous sodium hydroxide. The product solidifies rapidly and is collected and dried at 70° C. to obtain 6.7 g. of crude 2,8-dichloro-10-(3-dimethylaminopropylidene)-thiaxanthene, M.P. 92–95° C. Recrystallization from a mixture of alcohol and water gives 5.25 g. of the purified product, M.P. 97.5–99.0° C. The pure product obtained in another experiment melted at 99–100° C. (sintered at 98° C.).

*Analysis.*—Calculated for $C_{18}H_{17}NCl_2S$: C, 61.71; H, 4.89; N, 4.00. Found: C, 61.66; H, 4.94; N, 3.90.

EXAMPLE 14

2-Methyl-10-(3-Dimethylaminopropyl)-10-Hydroxythiaxanthene

By replacing the 2-chlorothiaxanthone used in Example 2, Step A, by an equimolecular quantity of 2-methylthiaxanthone, and following substantially the same procedure described in Step A of Example 2, there is obtained 2-methyl-10-(3-dimethylaminopropyl)-10 - hydroxythiaxanthene, M.P. 124.5–126.0° C.

*Analysis.*—Calculated for $C_{19}H_{23}ONS$: C, 72.81; H, 7.40; N, 4.47. Found: C, 72.74; H, 7.24; N, 4.44.

The 10-hydroxythiaxanthene thus obtained is dehydrated by substantially the same process described in Step B, Example 2, to 2-methyl-10-(3-dimethylaminopropylidene)-thiaxanthene hydrochloride, M.P. 196.5–198.5° C.

*Analysis.*—Calculated for $C_{19}H_{21}NS \cdot HCl$: C, 68.74; H, 6.68; N, 4.22. Found: C, 68.71; H, 6.53; N, 4.23.

EXAMPLE 15

2-Chloro-10-(3-Dimethylaminopropyl)-10-Hydroxythiaxanthene

*Step A.*—Magnesium turnings, 6.07 g. (0.25 mole), are ground under benzene in a mortar and placed in a 500 ml. three-necked flask equipped with a mercury sealed stirrer, reflux condenser and dropping funnel. Absolute ether, 110 ml., is added followed by 1.36 g. (0.013 mole) of ethyl bromide. An atmosphere of hydrogen is maintained in the apparatus throughout the reaction. A solution of 33.2 g. (0.2 mole) of 3-dimethylaminopropyl bromide in 146 ml. of absolute ether then is added at such a rate that refluxing is maintained. The addition required 35 minutes. 2-chlorothiaxanthone, 16.0 g. (0.065 mole), is added in portions of 4.0 g. at intervals of 30 minutes. The reaction mixture then is refluxed for 1 hour. The reaction mixture is treated with 100 ml. of water with stirring and cooling, then diluted with 100 ml. of benzene and filtered through a mat of glass wool. The filter cake is extracted with three 100 ml. portions of hot benzene and the combined extracts evaporated to give 20.8 g. of crude 2-chloro-10-(3-dimethylaminopropyl)-10-hydroxythiaxanthene. The purified product is obtained by a process of recrystallization and extraction of the mother liquors by citric acid, the base is liberated from the citric acid solution by sodium hydroxide. The combined yield is 61%, M.P. 152–153° C.

EXAMPLE 16

2-Chloro-10-(3-Dimethylaminopropyl)-10-Hydroxythiaxanthene

The Grignard reagent is prepared from 6.07 g. (0.25 mole) of magnesium and 24.3 g. (0.2 mole) of dimethylaminopropyl chloride in 256 ml. of absolute ether following the procedure of Example 15. 2-chlorothiaxanthone, 24.67 g. (0.1 mole) is added in 5 portions at 30 minute intervals. The product is isolated substantially as described in Example 15. The yield of recrystallized 2-chloro - 10-(3-dimethylaminopropyl)-10-hydroxythiaxanthene, M.P. 152.5–154.0° C., is 15.24 g. (46%).

EXAMPLE 17

2-Chloro-10-[3-(4-Morpholinyl)-Propyl]-10-Hydroxythiaxanthene

By replacing the 3-dimethylaminopropyl chloride used in Example 2, Step A, by an equimolecular quantity of 3-(4-morpholinyl)-propyl chloride and following substantially the same procedure as described in Step A of Example 2, there is obtained 2-chloro-10-[3-(4-morpholinyl)-propyl]-10-hydroxythiaxanthene, M.P. 113–115° C.

*Analysis.*—Calculated for $C_{20}H_{22}O_2NClS$: C, 63.91; H, 5.90; N, 3.73. Found: C, 64.18; H, 5.90; N, 3.72.

The thus obtained 10-hydroxythiaxanthene, 7.52 g. (0.02 mole), is dehydrated following substantially the same procedure as described in Step B, Example 2. The 2 - chloro - 10-[3-(4-morpholinyl)-propylidene]-thiaxanthene hydrochloride melted at 213.5–214.5° C. after repeated recrystallization from a mixture of absolute ethanol and absolute ether.

*Analysis.*—Calculated for $C_{20}H_{20}ONClS \cdot HCl$: C, 60.91; H, 5.37; N, 3.55. Found: C, 61.20; H, 5.43; N, 3.54.

EXAMPLE 18

*2-Chloro-10-[3-(1-Pyrrolidyl)-Propyl]-10-Hydroxythiaxanthene*

By replacing the 3-dimethylaminopropyl chloride used in Example 2, Step A, by an equimolecular quantity of 3-(pyrrolidyl)-propyl chloride and following substantially the same procedure described in Step A, of Example 2, there is obtained 2-chloro-10-[3-(1-pyrrolidyl)-propyl]-10-hydroxythiaxanthene, M.P. 137.5–139° C.

*Analysis.*—Calculated for $C_{20}H_{22}ONClS$: C, 66.74; H, 6.16; N, 3.89. Found: C, 66.66; H, 6.19; N, 3.89.

The thus obtained 10-hydroxythiaxanthene, 10.8 g. (0.03 mole), is dehydrated by the procedure described in Step B, Example 2. The 2-chloro-10-[3-(1-pyrrolidyl)-propylidene]-thiaxanthene hydrochloride is separated into the α- and β-forms by dissolving the solid residue in absolute alcohol and fractionally precipitating with absolute ether.

The α-form melts at 234–236° C. (dec.) after repeated recrystallization from a mixture of absolute alcohol and absolute ether.

*Analysis.*—Calculated for $C_{20}H_{20}NClS \cdot HCl$: C, 63.47; H, 5.33; N, 3.70. Found: C, 63.74; H, 5.49; N, 3.66.

The β-form is dissolved in water and the solution made basic with 10 N sodium hydroxide and the mixture extracted with benzene. After washing with water, the benzene extract is evaporated on the steam bath under reduced pressure. The β-isomer of 2-chloro-10-[3-(1-pyrrolidyl)-propylidene]-thiaxanthene crystallizes after storing at −15° C. and is recrystallized repeatedly from petroleum ether and from hexane until a constant M.P. of 83–85° C. is attained. The base then is converted to the hydrochloride that melts at 188–189° C. after crystallization from acetone.

*Analysis.*—Calculated for $C_{20}H_{20}NClS \cdot HCl$: C, 63.47; H, 5.33; N, 3.70. Found: C, 62.97; H, 5.63; N, 3.68.

EXAMPLE 19

*2-Fluoro-10-(3-Diethylaminopropyl)-10-Hydroxythiaxanthene*

The Grignard reagent is prepared from 4.86 g. (0.2 g. atom) of magnesium and 29.93 g. (0.2 mole) of 3-diethylaminopropyl chloride in 100 ml. of dry tetrahydrofuran essentially as described in Step A of Example 2. 2-fluorothiaxanthone, 23.02 g. (0.1 mole), is added to the chilled reaction mixture with stirring. After stirring for 1 hour at room temperature, the mixture is processed following the procedure described in Step A of Example 2. The yield of 2-fluoro-10-(3-diethylaminopropyl)10-hydroxy-thiaxanthene is 27.8 g. (80%) after recrystallization from a mixture of alcohol (No. 3A anhydrous) and water. Further recrystallization from mixtures of alcohol (No. 3A anhydrous) and water yields the product, 2-fluoro-10-(3-diethylaminopropyl)-10-hydroxythiaxanthene, melting at 109.5–111.0° C.

*Analysis.*—Calculated for $C_{20}H_{24}ONSF$: C, 69.53; H, 7.00; N, 4.06. Found: C, 69.55; H, 6.83; N, 4.04.

The thus obtained 10-hydroxythiaxanthene, 20.0 g. (0.058 mole), is dissolved in 100 ml. of chloroform and the solution saturated in the cold with dry hydrogen chloride. Acetyl chloride, 13.6 g. (0.174 mole), is added and after 10 minutes at room temperature, the solution is refluxed for 1 hour. The solvent then is evaporated on the steam bath under reduced pressure and the solid residue dried in a vacuum desiccator. The yield of 2-fluoro-10-(3-diethylaminopropylidene)-thiaxanthene hydrochloride is 21.0 g.

The hydrochloride thus obtained is crystallized from acetone and the more insoluble α-isomer of 2-fluoro-10-(3-diethylaminopropylidene)-thiaxanthene hydrochloride collected and recrystallized repeatedly from acetone until a constant M.P. of 185.5–186.5° C. is attained.

*Analysis.*—Calculated for $C_{20}H_{22}NSF \cdot HCl$: C, 66.01; H, 6.37; N, 3.85. Found: C, 66.09; H, 6.33; N, 3.85.

The acetone filtrate is concentrated to one-fourth of the original volume and the β-isomer collected and dissolved in water. The solution is made basic with 10 N sodium hydroxide and the mixture extracted with three portions of benzene. The combined benzene extracts are washed with water and the solvent evaporated on the steam bath under reduced pressure. The oily base, the β-isomer of 2-fluoro-10-(3-diethylaminopropylidene)-thiaxanthene, is converted to the hydrobromide that melts at 170–171° C. after repeated recrystallization from mixtures of absolute ethanol, acetone and absolute ether.

*Analysis.*—Calculated for $C_{20}H_{22}NSF \cdot HBr$: C, 58.81; H, 5.68; N, 3.43. Found: C, 58.79; H, 5.61; N, 3.38.

EXAMPLE 20

*4-Chloro-10-(3-Dimethylaminopropyl)-10-Hydroxythiaxanthene*

A solution of 3-dimethylaminopropylmagnesium chloride (0.2 mole) in 100 ml. of dry tetrahydrofuran is prepared following substantially the same procedure described in Step A, Example 2. 4-chlorothiaxanthone, 24.67 g. (0.1 mole), is added to the chilled solution and after 1 hour at room temperature, the mixture is processed essentially as described in Step A, Example 2. Crystallization of the solid residue from absolute ethanol affords 4-chloro-10-(3-dimethylaminopropyl)-10-hydroxythiaxanthene, M.P. 127–128° C.

*Analysis.*—Calculated for $C_{18}H_{20}ONClS$: C, 64.75; H, 6.04; N, 4.20. Found: C, 64.89; H, 5.98; N, 4.18.

The thus obtained 10-hydroxythiaxanthene, 15.0 g. (0.045 mole), is dehydrated following substantially the same procedure as described in Step B, Example 2. The 4-chloro-10-(3-dimethylaminopropylidene)-thiaxanthene hydrochloride thus obtained melts at 202–2003° C., after crystallization from a mixture of absolute ethanol and absolute ether.

*Analysis.*—Calculated for $C_{18}H_{18}NClS \cdot HCl$: C, 61.36; H, 5.44; N, 3.89. Found: C, 61.27; H, 5.56; N, 3.91.

EXAMPLE 21

*2-Chloro-10-(2,2-Dimethyl-3-Dimethylaminopropyl)-10-Hydroxythiaxanthene Hydrochloride*

The Grignard reagent is prepared essentially as described in Step A of Example 2 from 2.43 g. (0.1 g. atom) of magnesium and 14.97 g. (0.1 mole) of 2,2-dimethyl-3-dimethylaminopropyl chloride, using 1.09 g. of ethyl bromide and employing 100 ml. of dry tetrahydrofuran as solvent. To the chilled solution is added 24.67 g. (0.1 mole) of 2-chlorothiaxanthone and the mixture is stirred for 1 hour at room temperature. The product, 2-chloro-10-(2,2-dimethyl-3-dimethylaminopropyl)-10-hydroxythiaxanthene, is isolated following the procedure described in Step A, Example 2. After crystallization of a portion of the product from absolute ethanol, the 2-chloro-10-(2,2-dimethyl-3-dimethylaminopropyl)-10-hydroxythiaxanthene is converted to the hydrochloride that melts at 169.8–170.8° C. after repeated recrystallization from isopropyl alcohol-absolute ether mixtures.

*Analysis.*—Calculated for $C_{20}H_{24}ONClS \cdot HCl$: C, 60.29; H, 6.33; N, 3.52. Found: C, 60.54; H, 6.33; N, 3.52.

The remainder of the 10-hydroxythiaxanthene obtained as described above is dehydrated following substantially the same procedure described in Step B, Example 2, thus forming 2-chloro-10-(2,2-dimethyl-3-dimethylaminopropylidene)-thiaxanthene hydrochloride.

EXAMPLE 22

*2-Phenyl-10-(3-Diethylaminopropyl)-10-Hydroxythiaxanthene*

A solution of 3-diethylaminopropylmagnesium chloride (0.2 mole) in 100 ml. of dry tetrahydrofuran is prepared by substantially the same procedure as in Step A, Example 11. 2-phenylthiaxanthene, 28.83 g. (0.1 mole), is added to the chilled solution and after 1 hour at room temperature, the reaction mixture is processed following substantially the same procedure described in Step A, Example 2. The 2-phenyl-10-(3-diethylaminopropyl)-10-hydroxythiaxanthene thus obtained melts at 152–153° C. after crystallization from alcohol (No. 3A anhydrous).

*Analysis.*—Calculated for $C_{26}H_{29}ONS$: C, 77.38; H, 7.24; N, 3.47. Found: C, 77.29; H, 7.25; N, 3.45.

The thus obtained 10-hydroxythiaxanthene, 18.54 g. (0.046 mole), is dehydrated by substantially the same procedure as described in Step B, Example 2, to 2-phenyl-10-(3-diethylaminopropylidene)-thiaxanthene hydrochloride.

EXAMPLE 23

*2-Chloro-10-(1-Methyl-3-Piperidylmethyl)-10-Hydroxythiaxanthene*

By replacing the 3-dimethylaminopropyl chloride employed in Example 2, Step A, by an equimolecular quantity of 1-methyl-3-piperidylmethyl chloride and following substantially the same procedure described in Step A, of Example 2, there is obtained a mixture of diastereo isomers of 2-chloro-10-(1-methyl-3-piperidylmethyl)-10-hydroxythiaxanthene. The product thus obtained is triturated with cold hexane. The insoluble α-form is collected and after repeated recrystallization from a mixture of alcohol (No. 3A anhydrous) and water melts at 182–183.5° C.

*Analysis.*—Calculated for $C_{20}H_{22}ONClS$: C, 66.74; H, 6.16; N, 3.89. Found: C, 67.09; H, 6.23; N, 3.86.

Concentration of the hexane filtrate affords the β-form that melts at 130–135° C. after repeated crystallization from hexane.

*Analysis.*—Calculated for $C_{20}H_{22}ONClS$: C, 66.74; H, 6.16; N, 3.89. Found: C, 66.98; H, 6.14; N. 3.90.

A suspension of 3.6 g. (0.01 mole) of the α-isomer of 2-chloro-10-(1-methyl-3 - piperidylmethyl) - 10 - hydroxythiaxanthene in 15 ml. of dry, alcohol-free chloroform is treated with 2.36 g. (0.03 mole) of acetyl chloride. The clear yellow solution is refluxed for 1½ hours and the solvent then evaporated on the steam bath under reduced pressure. The residue is dissolved in water and the solution made basic with 10 N sodium hydroxide. The mixture is extracted with ether and the ether extract washed with water and dried over anhydrous sodium sulfate. Evaporation of the solvent on the steam bath under reduced pressure leaves 3.3 g. of semisolid residue. This base, the 2-chloro-10-(1-methyl-3-piperidylmethylene)-thiaxanthene, is converted to the hydrogen oxalate that melts at 208.5–209.5° C. after repeated recrystallization from a mixture of absolute ethanol and absolute ether.

*Analysis.*—Calculated for $C_{20}H_{20}NClS \cdot C_{2}H_{2}O_{4}$: C, 61.18; H, 5.14; N, 3.24. Found: C, 60.98; H, 5.44; N, 3.27.

EXAMPLE 24

*2-Chloro-10-Hydroxy-10-[3-(4-Methyl-1-Piperazinyl)-Propyl]-Thiaxanthene*

The Grignard reagent is prepared from 11.02 g. (0.0625 mole) of 3-(1-methyl-4-piperazinyl)-propyl chloride and 1.52 g. (0.0625 mole) of magnesium in 100 ml. of tetrahydrofuran, employing 1.1 g. of ethyl bromide to initiate the reaction. The solution is cooled to 10–15° C. and stirred while 2-chlorothiaxanthone, 15.4 g. (0.0625 mole) is added. After stirring for 1 hour at room temperature, the bulk of the solvent is evaporated at 40–50° C. under reduced pressure and the residue treated with 150 ml. of benzene. Water is added to hydrolyze the Grignard adduct and the benzene layer separated by decantation. The pasty residue is extracted with additional portions of boiling benzene and the combined solutions extracted with three successive 50 ml. portions of a 10% aqueous citric acid solution. The citric acid solution is made basic with sodium hydroxide and the base that separates extracted into benzene. After evaporation of the benzene the crude product solidifies. Crystallization from a mixture of alcohol (No. 3A anhydrous) and water gives 12.73 g. (52%) of product, M.P. 145–146° C. The melting point is unchanged by further recrystallization.

*Analysis.*—Calculated for $C_{21}H_{25}ON_{2}ClS$: C, 64.85; H, 6.48; N, 7.20. Found: C, 64.72; H, 6.39; N, 7.21.

EXAMPLE 25

*10-Hydroxy-10-(1-Methyl-4-Piperidyl)-Thiaxanthene*

*Step A.*—Preparation of 1-methyl-4-piperidylmagnesium chloride.—Magnesium turnings (3.65 g., 0.150 g. atom) were placed in a 1 liter, 4-neck flask provided with 2–500 ml. dropping funnels, condenser and stirrer. An atmosphere of dry nitrogen was maintained in the apparatus throughout the reaction. One ml. of an ethyl ether solution of ethyl magnesium bromide was added as initiator and then a solution of 20.1 g. (0.150 mole) of 1-methyl-4-chloropiperidine in 250 ml. of dry, peroxide-free tetrahydrofuran was added dropwise from one of the dropping funnels at a rate which maintained gentle reflux. When the addition was complete, the reaction mixture was heated under reflux for an additional two hours.

*Step B.*—Preparation of 10-hydroxy-10-(1-methyl-4-piperidyl)-thiaxanthene.—The reaction mixture of Step A then was cooled to 5°–10° C. and stirred at this temperature while a slurry of 23.5 g. (0.111 mole) of thiaxanthone in 300 ml. of tetrahydrofuran was added over one hour from the second dropping funnel. After stirring for two hours, during which the reaction mixture was allowed to warm up to room temperature, it was returned to 10° C. and 15 ml. of water added slowly with vigorous stirring. The reaction mixture was allowed to remain at room temperature overnight.

The tetrahydrofuran solvent was removed under vacuum at 50° C. and the resulting solid extracted continuously with chloroform in a Soxhlet apparatus for 8 hrs. Removal of the chloroform solvent under vacuum yielded 37.4 g. of white solid which was purified by conversion to the hydrogen maleate salt with maleic acid. Recrystallization of the maleate from a chloroform-ethyl ether solvent mixture yielded 19.8 g. (41.7%) of maleate salt with a M.P. of 196.1°–198.6° C., dec. The free base was obtained by stirring the maleate with 300 ml. of a 10% sodium hydroxide solution at 5° C. for 10 minute, filtering and drying the resulting solid at 75° C. Recrystallization from a chloroform-hexane solvent mixture gave 12.7 g. (36.7%) of a light tan solid, M.P.=188.6°–191.1° C. Further recrystallization gave an analytical sample, M.P.=192.60–193.4° C.

$\lambda_{max.}^{MeOH}$ 214 mµ

ε24,690; 267 mµ, ε11,536; shoulder at 251–4 mµ; min. at 238–40 mµ.

*Analysis.*—Calculated for $C_{19}H_{21}NOS$: C, 73.26; H, 6.80. Found: C, 73.19; H, 7.10.

EXAMPLE 26

*2-Chloro-10-Hydroxy-10-(1-Methyl-4-Piperidyl)-Thiaxanthene*

*Step A.*—Preparation of 1-methyl-4-piperidylmagnesium chloride.—Magnesium turnings (2.43 g., 0.1 g. atom) were placed in a 500 ml. 3-necked flask that was equipped with a stirrer, condenser and dropping funnel and protected by soda-lime filled drying tubes. An atmosphere of dry nitrogen was maintained in the apparatus throughout the experiment. The magnesium was covered with 20 ml. of dry tetrahydrofuran and a crystal of iodine was added. Ethyl bromide (1.09 g., 0.1 mole) was added and the mixture stirred and warmed if necessary to initiate the formation of ethyl-magnesium bromide. When the reaction was complete the solution was heated to refluxing and stirred while a solution of 13.36 g. (0.1 mole) of 1-methyl-4-chloropiperidine in tetrahydrofuran (volume of solution 61 ml.) was added dropwise, heat being applied as required to maintain refluxing. When the addition was complete stirring was continued and the reaction mixture was maintained at reflux for 1 hour.

*Step B.—Preparation of 2-chloro-10-hydroxy-10-(1-methyl - 4 - piperidyl) - thiaxanthene.*—The solution of the Grignard reagent obtained in Step A was cooled to 5–10° C. and stirred at this temperature while 2-chlorothiaxanthone (17.3 g., 0.07 mole) was added in portions. The cooling bath then was removed and the mixture stirred for 1 hour at room temperature. The bulk of the solvent then was distilled at 40–50° C. under reduced pressure and 150 ml. of benzene added to the residue. The mixture was stirred and cooled in an ice-bath while 50 ml. of water was added dropwise with stirring to hydrolyze the Grignard adduct. The benzene layer was decanted and the residue extracted with three successive 75 ml. portions of boiling benzene. The benzene extracts were combined, the solvent distilled and the residue dried on the steam-bath under reduced pressure. The oily yellow solid weighed 24.2 g. It was recrystallized from isopropyl alcohol to give 9.4 g. of product, M.P., 221.8–222.8° C., unchanged by further recrystallization.

*Analysis.*—Calculated for $C_{19}H_{20}ClNOS$: C, 65.97; H, 5.83; N, 4.05; Cl, 10.25. Found: C, 66.01; H, 5.84; N. 4.00; Cl, 10.13.

EXAMPLE 27

*2-Trifluoromethyl-10-Hydroxy-10-(1-Methyl-4-Piperidyl)-Thiaxanthene*

By following substantially the same procedures described in Example 26, but replacing the 2-chlorothiaxanthone employed in Step B by an equimolecular quantity of 2-trifluoromethylthiaxanthone, there is obtained 2-trifluoromethyl - 10 - hydroxy - 10 - (1-methyl-4-piperidyl)-thiaxanthene.

While the invention has been illustrated to be particularly 10 - (3-tertiaryaminopropyl)-10-hydroxythiaxanthene compounds and particularly methods for the preparation of these compounds, the invention embraces the chemical equivalents of the specifically identified compounds as well as the modifications of the methods described for their synthesis.

What is claimed is:
1. Compounds having the structural formula:

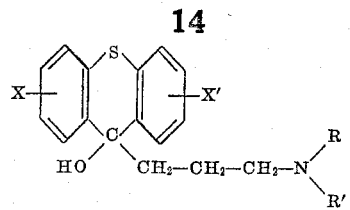

wherein X and X' respectively is selected from the group consisting of hydrogen, halogen, lower-alkyl, perfluoro-lower-alkyl, lower-alkoxy, and phenyl;

is selected from the group consisting of di-lower alkyl-amino, 1-piperidyl, 1-pyrrolidyl, 4-methyl-1-piperazinyl, and 4-morpholinyl, and di-lower-alkylamino in which one of the alkyl radicals is attached to a carbon of the propyl chain to thereby form radicals attached to the 10-carbon which are selected from the group consisting of 1-methyl-3-piperidylmethyl and 1-methyl-4-piperidyl.

2. Compounds having the structural formula:

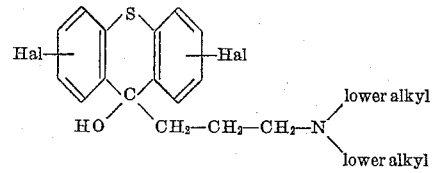

wherein Hal is a halogen.

3. Compounds having the structural formula:

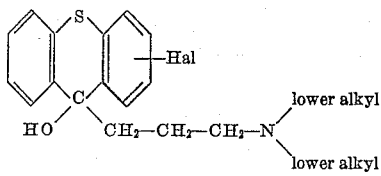

wherein Hal is a halogen.

4. 2 - chloro-10-(3-dimethylaminopropyl)-10-hydroxy-thiaxanthene.

5. 10 - (3-dimethylaminopropyl)-10-hydroxythiaxanthene.

6. 10 - (1-methyl-4-piperidyl)-10-hydroxythiaxanthene.

No references cited.